Feb. 5, 1935. F. CREEDY Re. 19,446

DYNAMO ELECTRIC MACHINE

Original Filed April 2, 1927 2 Sheets-Sheet 1

INVENTOR.
Frederick Creedy.
by:- A. E. Odell
Attorney.

DYNAMO ELECTRIC MACHINE

Original Filed April 2, 1927 2 Sheets-Sheet 2

INVENTOR.
Frederick Creedy.
by A. E. Odell
Attorney.

UNITED STATES PATENT OFFICE 19,446

DYNAMO-ELECTRIC MACHINE

Frederick Creedy, Bethlehem, Pa.

Original No. 1,859,196, dated May 17, 1932, Serial No. 180,581, April 2, 1927. Application for reissue May 15, 1934, Serial No. 725,827. In Great Britain April 16, 1926

22 Claims. (Cl. 219—8)

This invention relates to direct current generators, and its purpose is the production of a generator the characteristic of which shall be the same for rapid fluctuations of load as for slow variations.

A particular purpose of the invention is the production of a generator for use in arc welding having the falling voltage-current characteristic, steeply falling above full load current, appropriate to this purpose, said characteristic being substantially unaltered by any transient effects arising from momentary lengthening or shortening of the arc.

With these purposes in view the invention comprises a generator having shunt or separate excitation or both, and opposing series excitation, and substantially no magnetic leakage as between its armature circuit (which includes the series field winding) and its other exciting circuit or circuits.

Otherwise stated the invention is a shunt or separately excited generator with opposing series excitation in which the armature self-induction is reduced to a minimum.

For attaining minimum magnetic leakage the invention contemplates, in most cases, the provision of a stationary winding in which variations of the armature currents may be substantially reflected, as by permitting them to induce in a short-circuited winding or coils co-axial with the commutating zone, currents substantially equal and opposite to their variations.

In a preferred development of the invention the magnetomotive force of the armature is balanced by a neutralizing winding which carries the armature currents; and in this development the invention is a D. C. generator having shunt or separate excitation, opposing series excitation, and a stationary neutralizing winding in series with the armature.

The invention further contemplates the reduction of magnetic leakage as between the armature circuit and the shunt or separately excited windings, either or both of which, according as one or other is used alone or both together, may be designated the principal exciting circuit, by interspersing the turns or layers of the opposite series winding among the turns or layers of the principal exciting circuit.

The invention also includes a welding generator in which the effect of shunt and separate excitation is obtained by a single principal exciting winding by connecting it in shunt with the armature and joining an exciter or other separate source of E. M. F. in series with it.

The invention is particularly concerned with D. C. generators having opposing series excitation in addition to their principal excitation, in which the exciting windings are upon a slotted stator. It is a feature of the invention when embodied in such machines to concentrate the principal exciting circuit in one or more slots per pole which contain no other windings; and the invention further contemplates the arrangement of the end connections of all the stator windings in such manner that the coils of the principal exciting circuit may be removed without disturbing any other windings.

A particular form of the invention is a generator having a slotted stator in which in addition to the principal exciting circuit a drum winding is provided and connected in series with the armature by tappings so located that the winding has the effect of both a neutralizing and an opposing series winding.

A further development of the invention consists in a D. C. generator with a slotted stator having principal and opposing series excitation, and having also upon the stator a winding for A. C. excitation, and upon the armature a winding adapted to co-operate with the A. C. field so as to constitute an induction motor while also serving to generate the D. C. currents, whereby a single machine is made to act as an A. C. motor and D. C. generator, that is to say as a converter, which is particularly convenient when it is desired to execute arc welding in a shop supplied with alternating current.

Further developments and modifications of the invention will appear from the following description and appended claims.

Embodiments of the invention are illustrated in the accompanying drawings.

Figure 4:
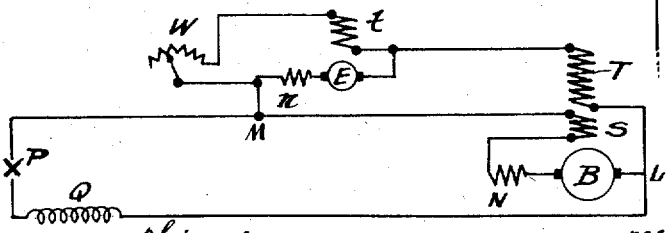
Figure 4 shows a generator system for welding including a main generator and a separate exciter.
Figure 4A:
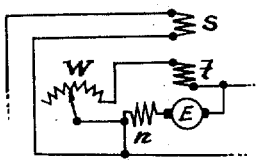
Figure 4B:
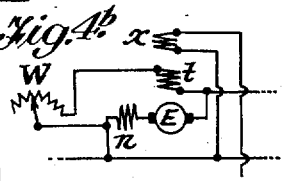

Figures $4^a$ and $4^b$ show modifications of the system shown in Figure 4.

Figure 5:
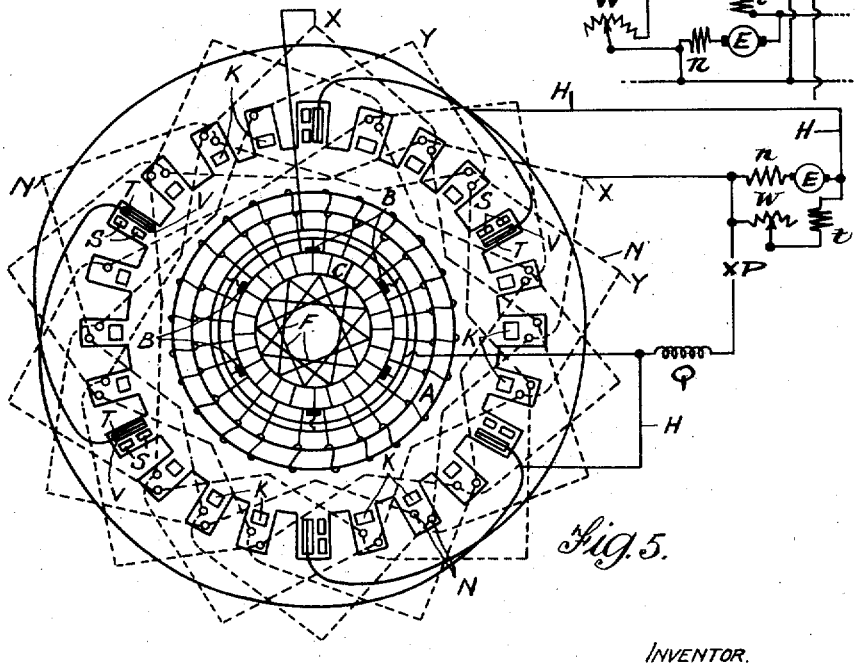

Figure 5 shows a motor generator for welding, adapted to be driven from an alternating current supply, and equipped with an exciter.

Figure 6:
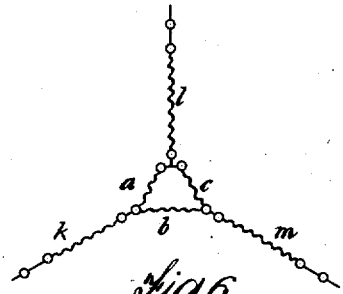

Figure 6 illustrates a modification of the winding of Figure 5.

Figure 1:
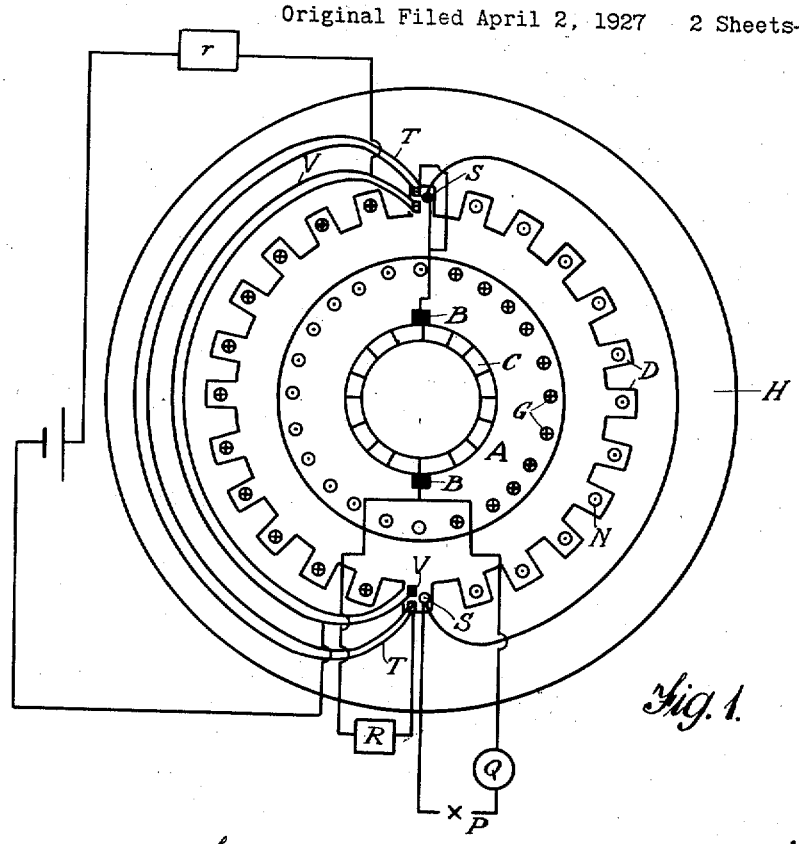
Figure 1 is a diagram of a welding generator without salient poles.

In Figure 1 A is the armature with a winding G connected to brushes B upon the commutator C. The stator H is shown with 24 slots D. All of these slots except those in the commutating zone contain a neutralizing winding N joined, by connections not shown, in series with the armature. The dots and crosses indicating the direction of the currents in this winding and the armature bars show that the neutralizing winding tends to balance the magnetizing effect of the armature winding. The winding should preferably be so designed as to rather more than balance the magnetomotive force of the armature, in order that a commutating field may be created, giving the same effect as a commutating pole in a salient pole machine. To give the characteristic required for welding, some slots, in the example shown the slots in the commutating zone,—contain an opposing series winding S S, also in series with the armature and the external circuit, which is shown as comprising an arc P and a steadying inductance Q. Some slots, preferably, as shown, those which contain the series exciting winding, contain a shunt exciting winding T having a rheostat R in its circuit. There may also be a separately excited winding V, supplied from an external source of E. M. F. and controlled by a resistance *r*. The shunt and separately excited winding create the generator field and are opposed by the series winding. The effect of placing the series and shunt winding in the same slots—and preferably the separately excited winding also, though this is less important—is to make their mutual inductance as high as possible or in other words to diminish to a minimum magnetic leakage between them. A machine having a neutralizing winding may be made with a much smaller air gap than is usual with machines having no neutralizing winding, and the stator therefore requires many fewer turns in its shunt winding than a salient pole machine, so that it is easy to concentrate the shunt winding in the same slots as the series winding, and in fact, all the field windings may conveniently be confined to a few slots or even a single slot per pole, these slots containing no other windings. Still further to reduce the leakage it is preferable that the shunt and series windings should be placed, as shown, side by side in the slot, and not one above the other.

Figure 2:
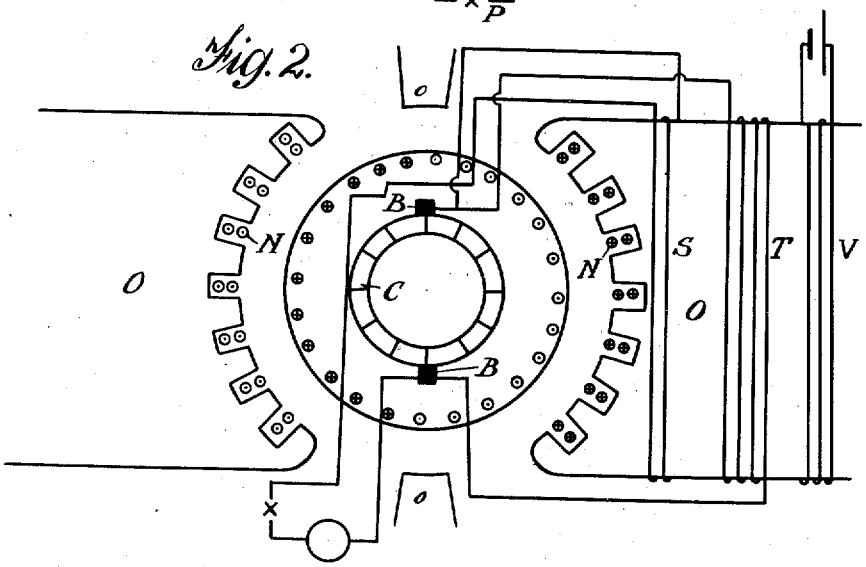
Figure 2 is a diagram of a welding generator with salient poles.
Figure 3:
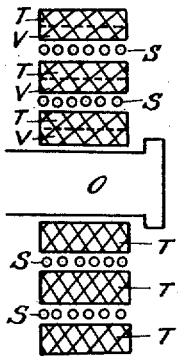
Figure 3 shows the interleaving of series and other field windings.

Figure 2 shows a generator of substantially similar properties built as a salient pole machine. It is shown as having two main poles O and two commutating poles *o*. The neutralizing winding N is placed in slots in the face of the main poles, and if it be arranged to more than balance the armature magnetomotive force there is no need to provide a winding on the commutating poles *o*. The series, shunt and separately excited windings S, T, V are now spools upon the salient poles. In order to diminish leakage betwen them it is preferable to intersperse the turns of the series winding among those of the shunt winding, for instance placing the layers of the series winding at intervals among the layers of the shunt winding. As the series turns are few and the shunt turns many it is convenient to subdivide the former by winding several series coils in parallel. For example if the shunt winding requires 2,400 turns and the series winding 6, the shunt winding may be made up of 30 layers each of 80 turns, and the series winding of two layers of 6 turns connected in parallel. These may then be interleaved as shown at S and T in Figure 3, there being 10 layers of the shunt winding on both sides of each layer of the series winding. If there is a separately excited winding also it may be distributed similarly to the shunt winding as indicated at V.

It is not necessary to employ separate windings to obtain the advantage of shunt and separate excitation. A single winding may be connected in series with the exciter across the brushes of the generator as shown in Figure 4. In this diagram the neutralizing winding is indicated by a winding N joined in series with a series field winding S, the arc P and a steadying inductance Q across the brushes B. The generator system includes an exciter E, this element being in some of the claims identified as "a winding", which preferably is also equipped with a neutralizing winding *n*. The remainder of the field excitation of the main generator consists of a coil T joined in series with the armature and neutralizing winding of the exciter across the terminals L, M of the generator. The excitor has a shunt winding *t* with a regulating resistance *w* or it may be separately excited; and it may have additional excitation such as a winding *x* in shunt across the generator or an opposing winding *s* in series with the generator. The effect of winding *s* is to reduce the number of turns required in the opposing series winding S of the generator.

It is important that the inductance of the armature circuit L, B, B, N, S, M, in parallel with the exciting circuit L, T, E, M, should be as low as possible. In other words, the inductance of the armature circuit between the tapping points L M should be made as low as possible. The steadying inductance Q must therefore be outside of the tapping points L M. Moreover with this machine the fluctuation of the arc current can be limited to a given percentage value with a smaller external inductance than has hitherto been usual.

Where the electric supply available is an alternating current supply the stator type of welding generator described with reference to Figure 1 may be modified to serve as a motor generator or converter. Such a modification is shown in Figure 5 which represents diagrammatically a single machine having windings which make it serve as a 2-pole 3-phase induction motor and as a 6-pole D. C. generator. The winding K, the end connections of which are not shown, is a 2-pole three phase winding and receives current from the alternating current mains. The armature A is shown as ring wound merely for the sake of clearness. Equalizers F joining points on the commutator C one third of the circumference apart complete circuits in which the two-pole alternating field can induce currents causing the rotation of the armature, and they also perform the ordinary function of equalizers in respect of the D. C. generator. As in Figure 1 the generator field windings are contained in one slot per pole, the series, shunt and separately excited windings S T V being arranged side by side. If the end connections are suitably arranged these windings may be removable without disturbing any other windings. Preferably the windings T, V are made one winding as described with reference to Figure 4, and this is connected by leads H in series with an exciter E and the neutralizing winding N across the brushes B, B. The neutralizing winding N is arranged in the remaining slots beneath the A. C. winding K. It is constructed as a 2-circuit drum winding, and the main current of the D. C. generator may be introduced into it by suitably placed tappings. If the tappings are placed at Y Y the neutralizing winding will serve only for neutralizing; if the tappings are placed at, say, X X the magnetomotive force of the winding will have a component along the axes of the D. C. field and so the winding will act both as a neutralizing winding and a series winding. The arc P and the steadying inductance Q are as before joined across the brushes B, B in series with the winding N.

For other pole numbers, for instance where the A. C. pole number is an even multiple of the D. C. pole number, it is possible to use a multiple circuit drum winding.

The starting characteristics of the motor part of the machine may be improved by connecting the generator field winding, T, V, or a part of it into the circuit of the motor field winding K. For this purpose the winding T, V is constructed of three coils each spanning half the circumference of the machine. For D. C. excitation the three coils are joined in series and their ends H, H connected to the exciter E and brushes B, as above described. For starting purposes the ends H, H are disconnected from the exciter and brushes and joined together. The winding T, V then constitutes a mesh and may be connected into the centre of the star winding K in the manner shown in Figure 6, the junctions of the three coils *a*, *b*, *c*, being joined to the inner ends of the three limbs *k*, *l*, *m*, of the star. In many cases it is not necessary to disconnect H, H from the exciter and the brushes and join them together, but it is sufficient to provide tappings from the two junctions of the coils and connect them to the winding K as in Figure 6. In either case a part only of all the three coils of the winding T, V may be employed in this manner, the remaining part being temporarily disconnected and left on open circuit. By way of summary and further explanation, it may be noted in the preferred machine within the invention all of its inductances are kept as low as practicable, especially that of the field. In order to do this, the reluctance of the magnetic field is minimized, thereby permitting a small number of turns on the field. Cooperatively with this, a heavy, steadying inductance Q is used in the welding circuit. The system therefore comprises the generating machine possessing low self induction and therefore small electrical inertia combined with a large external inductance which provides the main electrical inertia of the system. The explanation is that the inductance Q represents a large store of energy and is able to hold the current constant, provided the energy store in the machine represented by its inductances is kept as low as practicable. If on the contrary the energy store in the machine be high due to high inductances therein, as in prior machines, the inductance Q is not able to hold the current constant.

"The method of controlling currents in welding generators", which is performed in the operation of the above described apparatus, is the subject of an application filed April 15, 1932, Serial No. 605,516 for "Method of controlling currents in welding apparatus."

What I claim is:—

1. A direct current generator comprising a field, armature and commutator, a main exciting winding on said field, an armature winding connected to said commutator, brushes on said commutator, a reverse series winding on said field connected to said brushes, said armature winding and reverse series winding being close coupled to said main exciting winding.

2. A direct current generating system comprising a main generator having a principal field winding connected in shunt to its armature, an opposing field winding in series with its armature winding, said armature and reverse series winding being close coupled to said principal field winding, means for neutralizing its armature field, and an exciter having its armature included in the shunt field circuit.

3. A compound wound direct current welding generator having a shunt field circuit, an opposing field winding in series with its armature winding, said armature winding and reverse series winding being close coupled to said shunt field circuit and a separate source of E. M. F. included in said shunt field circuit.

4. A direct current generating system, comprising a main generator and a separate exciter, a field winding on said generator supplied from said exciter, means for substantially neutralizing the armature field of said generator, a principal field winding on said exciter, and an opposing field winding on said exciter in series with the main generator.

5. A compound wound direct current generator comprising a slotted stator, a principal field winding and an opposing series field winding occupying alone some of the slots of said stator, a rotor with a commutator and a winding connected thereto, and a winding in other slots of said stator opposing the magneto-motive force of the rotor.

6. A compound wound direct current generator comprising a slotted stator, a rotor with a commutator and a winding connected thereto, a principal field winding and an opposing series field winding occupying alone some of the slots of said stator, and a neutralizing winding in other slots of said stator opposing the magnetomotive force of the rotor, the end connections of said field windings being arranged within the end connections of said neutralizing winding so that said field windings are separately removable.

7. A motor generator for welding comprising a slotted stator, a rotor, an exciting winding on said stator adapted for connection to an alternating current supply, a principal direct current field winding on said stator, an opposing series field winding, a neutralizing winding, a commutator, a winding on said rotor connected to said commutator having circuits in which the alternating current field can induce currents and in which the direct current field generates no E. M. F. and other circuits in which current is generated by the direct current field.

8. A motor generator according to claim 7 wherein the direct current field winding and opposing series field winding occupy alone some of the slots of the stator.

9. A motor generator, for welding comprising a slotted stator and rotor, an A. C. exciting winding on said stator, a principal D. C. field winding and an opposing series winding on said stator, a commutator, a winding on said rotor connected to said commutator and adapted to co-operate with both said A. C. exciting winding and the D. C. field windings, and means for connecting turns of the D. C. field winding into the A. C. exciting circuit for starting purposes.

10. A compound wound direct current generator comprising a slotted stator and rotor, a principal exciting winding on said stator, a drum winding on said stator, a commutator, a winding on said rotor connected to said commutator and tappings on said drum winding connecting it in series with said rotor winding.

11. A compound wound direct current generator comprising a slotted stator and rotor, a principal exciting winding on said stator, a drum winding on said stator, a commutator, a winding on said rotor connected to said commutator, and tappings on said drum winding connecting it in series with said rotor winding, said tappings being so located that said drum winding acts in part as an opposing series winding and in part as a neutralizing winding.

12. A direct current generator having a principal field winding, and an opposing field winding in series with its armature, said windings having their individual turns in close proximity.

13. A direct current generator having a separately excited field winding, and an opposing field winding in series with its armature, said windings having their individual turns in close proximity.

14. A direct current generator comprising a field, armature and a commutator, a main exciting winding on said field, an armature winding connected to said commutator, brushes on said commutator, a winding connected in series with said brushes opposing the excitation of said main exciting winding, said armature winding and opposed series winding being close coupled to said main exciting winding by reducing the reluctance of the main magnetic circuit to a minimum so that the reduced ampere turns of the said main exciting winding produce less flux through the leakage paths.

15. A direct current welding generator with falling voltage-current characteristic, said generator comprising an armature, a field and windings therefor, the field winding comprising a main winding and an opposing winding in series with the armature, said main and opposing series windings being close coupled and there being a short air gap between the armature and the field, all of said windings having the reduced number of turns and the low inductance permitted by close coupling and shortness of air gap consistent with operativeness for generating the arc-welding current.

16. A direct current welding generator with falling voltage-current characteristic, said generator comprising an armature, a field and windings therefor, the field winding comprising a main winding and an opposing winding, the latter in series with the armature, the main winding and the opposing series winding being close coupled and there being a small air gap between the armature and the field, the main winding as permitted by the small air gap being a reduced-number-of-turns low inductance winding, and the armature winding and the opposing series winding being also low inductance windings, whereby transient effects are materially diminished arising from momentary lengthening and shortening of the welding arc fed by said generator.

17. A direct current welding generator with falling voltage-current characteristic, said generator comprising an armature, a field and windings therefor, the field comprising a main winding and an opposing winding, the latter in series with the armature, said main winding and the opposing series winding being close coupled and there being a reduced air gap between the armature and field, a neutralizing winding permitting said reduced air gap, said neutralizing winding being in circuit with the armature and forming part of the field, the main winding as permitted by said reduced air gap being a reduced-number-of-turns low inductance winding, and the armature winding and the opposing series winding being also low inductance windings, whereby transient effects are materially diminished arising from momentary lengthening and shortening of the welding arc fed by said generator.

18. A compound wound direct current generator comprising a slotted stator, a principal field winding and an opposing series field winding close coupled in some of the slots of said stator, a rotor with a commutator and a winding connected thereto, a neutralizing winding in other slots of said stator opposing the magneto-motive force of the rotor, there being a reduced air gap between the rotor and the stator as permitted by said neutralizing winding, and the principal field winding being a reduced-number-of-turns low inductance winding as permitted by the reduced air gap.

19. A compound wound direct current generator comprising a slotted stator, a principal field winding and an opposing series field winding close coupled in some of the slots of said stator, a rotor with a commutator and a winding connected thereto, a neutralizing winding in other slots of said stator opposing the magneto-motive force of the rotor, there being a reduced air gap between the rotor and the stator as permitted by said neutralizing winding, and the principal field winding being a reduced-number-of-turns low inductance winding as permitted by the reduced air gap, and the rotor winding and the opposing series field winding having minimized inductance.

20. In combination, an arc welding circuit, and an arc welding generator with falling voltage-current characteristic connected to supply the welding circuit, said circuit including a high inductance in series with the arc, and said generator having low inductance generating circuits whereby transient effects are materially diminished as compared with those produced when said high inductance in the welding circuit is used with a generator having high inductance generating circuits.

21. In combination, an arc welding circuit, and an arc welding generator with falling voltage-current characteristic connected to supply the welding circuit, said circuit including a high inductance in series with the arc, the generating circuits of said generator including a low inductance armature circuit whereby transient effects are materially diminished as compared with those produced when said high inductance in the welding circuit is used with a generator having high inductance generating circuits.

22. In combination, an arc welding circuit, and an arc welding generator with falling voltage-current characteristic connected to supply the welding circuit, said circuit including a high inductance in series with the arc, the generating circuits of said generator including a low inductance field circuit whereby transient effects are materially diminished as compared with those produced when said high inductance in the welding circuit is used with a generator having high inductance generating circuits.

FREDERICK CREEDY.